Figure 1:
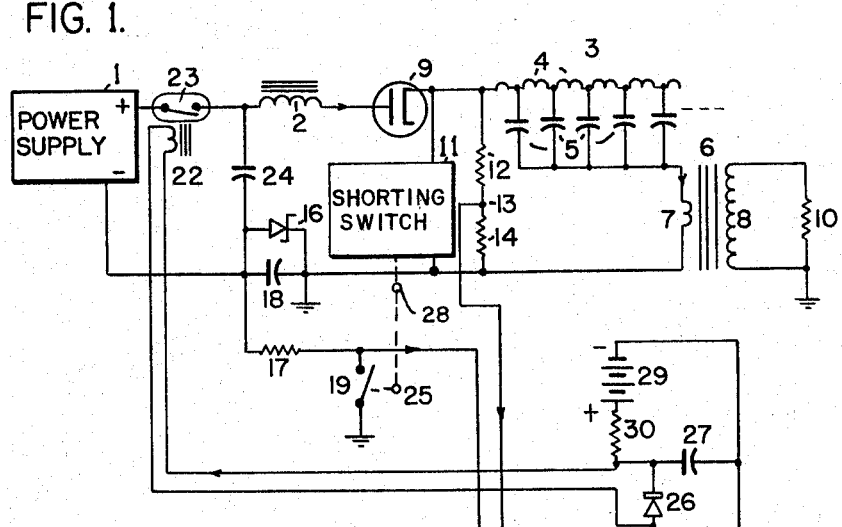

Oct. 4, 1966  J. A. ROSS  3,277,342

OVERLOAD SENSING CIRCUIT FOR LINE TYPE MODULATOR

Filed July 30, 1962

INVENTOR.
JAMES A. ROSS
BY
Harry R. Lubcke
AGENT

United States Patent Office 3,277,342
Patented Oct. 4, 1966

3,277,342
OVERLOAD SENSING CIRCUIT FOR LINE
TYPE MODULATOR
James A. Ross, Anaheim, Calif., assignor to Ling-Temco-
Vought, Inc., Dallas, Tex., a corporation of Delaware
Filed July 30, 1962, Ser. No. 213,420
11 Claims. (Cl. 317—27)

My invention relates to a circuit for sensing overload conditions in pulse-producing apparatus and particularly to such a circuit in which this condition is detected in its early stages and the power removed from the apparatus before a major fault occurs.

It will be evident that this circuit has wide application, but a particular application of great value occurs when several pulse-producing apparatuses are powered from one power supply. In practice, ten or even thirty such apparatuses may be so powered, where multiple line type modulators are to be operated as a part of one whole system.

The typical load upon the modulators may be a klystron in each instance and for high powers an ignitron may be employed for shorting the artificial line to form the modulating pulse. While these tubes are as reliable as man can make them, they are subject to very brief flashovers and arc-backs, respectively. If each apparatus has its own protection circuit, the other apparatus may continue to function should one apparatus have a fault. Furthermore, in most faults, if the energizing voltage is removed for as short a time interval as one millisecond, the fault will clear itself and the apparatus is in a condition to resume normal operation. It is thus seen that a system of line type modulators or the like having individual overload sensing circuits according to my invention may render relatively uninterrupted service whereas the same system in which an overload circuit breaker was employed in the primary of the power supply would not protect the system unless a large fault developed in one or more of the modulators.

Similarly, individual overload circuit breakers for each modulator would only operate when the fault current had exceeded the maximum current peak of normal operation. As will become evident later, according to my invention a fault can be detected at a small fraction of the current peak for normal operation and the modulator almost invariably returned immediately to service. At the same time, temporary or permanent damage to the apparatus is avoided.

My overload sensing circuit forms two voltages, one proportional to the voltage actuating the pulse-producing line and the other proportional to the current supplied to the individual line modulator from the power supply. These are both integrated values of voltage. Under normal conditions the former always has a larger amplitude than the latter. Under abnormal conditions the reverse is true. Summing means, having a polarized element, are provided to discern which is the larger and to give an output for abnormal conditions. This output is employed to briefly open a vacuum switch which is otherwise normally closed.

An object of my invention is to provide an overload sensing circuit capable of detecting overload conditions prior to the time that such conditions actually reach overload proportions.

Another object is to provide a quick-return overload current protection circuit for pulse-producing apparatus.

Another object is to provide a relatively small and inexpensive overload protection circuit, in that the currents broken thereby are at less than the full-load current of the apparatus protected.

Other objects will become apparent upon reading the following detailed specification and upon examining the accompanying drawings, in which are set forth by way of example an embodiment of my invention.

Figure 2:
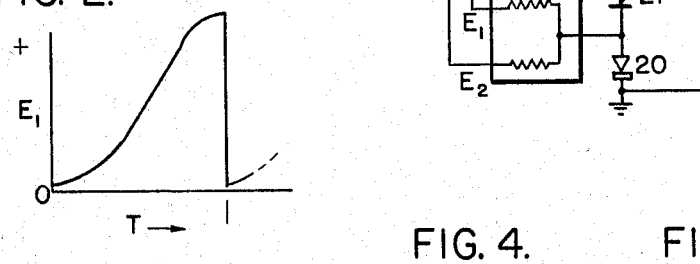
Figure 3:
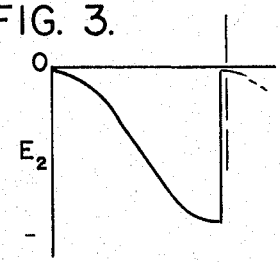
Figure 4:
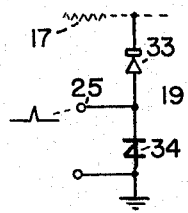
Figure 5:
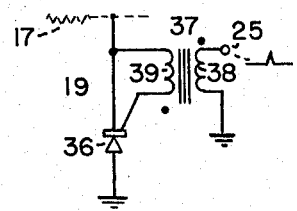
Figure 6:
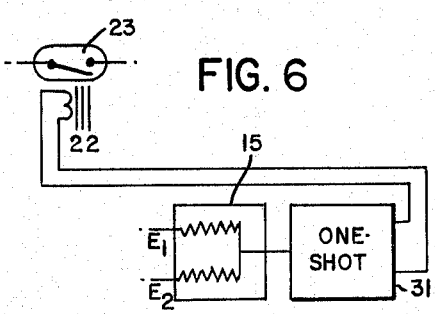

FIG. 1 shows the schematic circuit of my invention as applied to pulse-producing apparatus, FIG. 2 shows the voltage waveform corresponding to the voltage existing in the pulse-producing apparatus, FIG. 3 shows the voltage waveform corresponding to the current passing into the pulse-producing apparatus, FIG. 4 shows a four-layer diode semiconductor sensing circuit shorting switch, FIG. 5 shows a controlled rectifier alternate embodiment of the same switch, and FIG. 6 shows a one-shot multivibrator alternate embodiment of overload triggering means.

In FIG. 1, numeral 1 indicates a known power supply. This may employ a bridge rectifier and provide, say, 20 kilovolts (kv.) of direct current electrical energy at a current capability of ten amperes. In normal operation this supplies current through reactor (inductor) 2. The latter is connected, in turn, to the anode of vacuum diode 9, and from the cathode thereof to the artificial transmission line 3 composed of inductors 4 and shunt capacitors 5. The capacitors are also connected to primary 7 of pulse transformer 6. Secondary 8 of this transformer provides a stepped-up voltage pulse, which may have an amplitude of 300 kv., to a load 10. The load is shown as a resistor, but may take many forms, a typical one being a klystron vacuum tube.

The pulses are produced by line 4 and transformer primary 7 being shorted for an interval of the order of microseconds by switch 11. In practice this device may be an ignitron, a hydrogen thyratron, etc. Details of this aspect and of the elements 1 through 9 herein are more fully described in United States Patent No. 3,078,-418, granted Feb. 19, 1963, "High Power Pulse Type Modulator Employing Vacuum Tube to Divert Current for Ignition Deionization," (Serial No. 84,126, filed January 23, 1961).

A voltage divider 12, 14 is connected across switch 11 to sense the voltage appearing upon line 3. Typically, the voltage division ratio is 3,000 to one, so that a voltage upon the line of 36 kv. is registered at tap 13 as only 12 volts above ground. This is impressed as voltage $E_1$ upon summing network 15.

Zener diode 16 is inserted in the negative power supply connection to ground, and having a low resistance for voltages above twenty volts, serves to protect the integrating circuit immediately hereinafter described against excessive voltage.

From the terminal of Zener diode 16 that is away from ground a connection is made to integrating resistor 17 and integrating capacitor 18. The latter has a capacitance 3,300 times the ¼ microfarad capacitance of the network capacitance 5, i.e. 825 mfd.

Switch 19 is diagrammatic of an intermittently triggered shorting element, much of the nature of switch 11, but having only relatively small current carrying capability, of the order of ten amperes at a voltage of the order of ten volts. It may, therefore, be an ordinary electromagnetic relay, which is triggered by supplying current to the coil thereof. On the other hand, a four-layer diode or a semiconductor controlled rectifier are desirable alternates.

In any event, switch 19 shorts capacitor 18 through resistor 17 just a few microseconds before switch 11 shorts the line to produce the pulse output. This is so that voltage $E_2$ is always less than voltage $E_1$.

FIG. 2 is a plot of the voltage $E_1$, derived from line 3 as has been previously pointed out. FIG. 3 is a plot of the voltage $E_2$, which appears across capacitor 18 and forms the second input to summing network 15. These are both cosine curves and the absolute magnitude of the voltage shown in FIG. 3 is always less than that of FIG. 2. This situation is brought about by adjustment of the values of the elements as has been mentioned. Time (T) is the abscissa in these figures.

The above conditions are for normal operation.

Assume the abnormality of a continuing short because of a sustained arc in the ignitron, composing switch 11. In this case no voltage will appear across voltage-divider 12–14 and so the amplitude of waveform $E_1$ will be zero. It is seen that the increase in amplitude of $E_2$ from time equals zero need only be small before the normal condition of $E_1$ having the greater amplitude is reversed.

With the ignitron conducting the increase of current, sensed at elements 17, 18 as $E_2$, is substantially a linear increase with time from time equals zero. This gives an appreciable output more quickly than the cosine function for normal operation shown in FIG. 3. However, almost regardless of the type of fault the current will increase more rapidly than the voltage built up on line 3 and so $E_2$ will rapidly exceed $E_1$.

With the normal inputs at $E_1$ and $E_2$ to summing network 15, an output of positive polarity of small amplitude occurs at the conductor extending from element 15 toward the right. When the voltages $E_1$ and $E_2$ reverse in relative amplitude the output becomes negative in polarity. The absolute value of amplitude of the curve of FIG. 3 becomes greater than that of FIG. 2 at corresponding instants of time. Under fault conditions this difference soon becomes large. Such an output passes to the junction of diode 20 and four-layer diode 21.

This voltage raises the voltage already present across four-layer diode 21 above breakdown voltage for this diode and causes it to conduct. This energizes relay coil 22, which actuates vacuum switch 23. In FIG. 1 the switch is shown in the actuated position. Except when thus actuated the switch is normally closed, connecting the positive terminal of power supply 1 to indicated 2 inductor.

Current flowing in relay coil 22 discharges capacitor 27. This current continues to flow in coil 22 and diode 26 after capacitor 27 is discharged and until resistive losses in the coil and the diode cause the current to decay to near zero. This occurs in approximately one millisecond. When this has taken place contacts 23 reclose and normal operation is resumed.

Power supply 29 and resistor 30 start recharging capacitor 27 as soon as it has been discharged. As a result, capacitor 27 is fully recharged before contacts 23 reclose.

While various component values may be used throughout this invention, a value of approximately one-hundred microfarads with a twenty-five volt D.C. rating is suitable for capacitor 27. Similarly, resistor 30 may have a value of five ohms, power supply 29 a voltage output of eighteen volts D.C., and four-layer diode 21 a breakdown voltage of twenty.

It will be noted that the voltage $E_1$ results from an integration process as well as the specifically integrated voltage $E_2$. This is because voltage $E_1$ is proportional to the voltage built up across capacitor 5 as current flows into inductor-shunt-capacitor line 3.

Capacitor 24 is connected from the junction point between switch 23 and inductor 2 to the negative terminal of power supply 1. It is of small capacitance, of the order of ¼ microfarad, and is for the purpose of preventing transients when switch 23 is opened. The inductive flow of current through inductor 2 is momentarily supplied by discharge of the capacitor 24 and is caused to decrease slowly, rather than to be abruptly disrupted, as by opening the switch.

In order that waveform $E_2$ of FIG. 3 shall decrease to zero just before waveform $E_1$ of FIG. 2 does the same, the trigger pulse provided at trigger terminal 25 for switch 19 is advanced in time with respect to the same for trigger terminal 28 for switch 11. Alternately, the same trigger pulse timing may be used if the response of switch 19 is inherently more rapid. This is usual, since switch 19 is a small power device whereas switch 11 is a large power device.

In FIG. 4 the generic switch 19 of FIG. 1 is replaced by four-layer diode 34 and diode 33. The upper terminal of the latter connects to resistor 17, the two diodes are connected in series and the lower terminal of the former diode connects to ground. Synchronizing terminal 25 connects to the junction between the diodes and functions as before.

In FIG. 5 the generic switch 19 of FIG. 1 is replaced by controlled rectifier 36, which may be of the known silicon type. This device is connected exactly in place of switch 19 in FIG. 1, with the anode connected to ground. Synchronization for the control electrode of the rectifier is provided through transformer 37. Terminal 25 (FIG. 1) connects to primary 38. The other terminal of the primary connects to ground. The lower terminal of secondary 39 connects to the control electrode of controlled rectifier 36 and the upper terminal of the secondary connects to the cathode of the rectifier.

In an alternate embodiment of trigering means 21 according to FIG. 6 a one-shot multivibrator 31 is employed. This accepts the resultant of the opposed voltages from summing network 15 and is triggered when $E_2$ is greater than $E_1$. The multivibrator preferably has power transistors or power vacuum tubes and so operates coil 22 of disconnecting relay at a high level of power. Such a multivibrator per se is known and the substitutional connections are consonant with my invention.

Although specific examples of voltages, currents and values for the several circuit elements have been given this has been for example and illustration only. My invention may be practiced with considerable departures from such values, changes in characteristics of the elements and changes in details of circuit connections.

Having thus fully described my invention and the manner in which it is to be practiced, I claim:

1. In an electrical pulse-producing apparatus
   having an electrical power supply,
   electrical means to form a first amplitude of electrical energy proportional to the electrical operating status of said pulse-producing apparatus,
   electrical means to form a second amplitude of electrical energy proportional to the electrical energy supplied to said pulse-producing apparatus from said power supply,
   network means to compare said first with said second amplitudes of electrical energy,
   means to provide an electrical output whenever said second amplitude is greater than said first amplitude,
   and means to employ said electrical output to electrically disconnect said power supply from said pulse-producing apparatus.

2. The electrical apparatus of claim 1 in which the means to form the second amplitude of electrical energy comprises
   a capacitor connected to said power supply and to said apparatus
   and a resistor connected to said capacitor to form an integrated value of the electrical energy passing between said power supply and said apparatus.

3. The electrical apparatus of claim 2 in which shorting means are connected to said capacitor and to said resistor to periodically short the same.

4. The electrical apparatus of claim 1 in which the means to electrically disconnect comprises
   a four-layer semiconductor device constituted to conduct electricity upon being supplied said electrical output,
   and circuit disconnecting means connected to said semiconductor device for actuation thereby
   and also connected between said power supply and said pulse-producing apparatus.

5. The electrical apparatus of claim 1 in which the means to electrically disconnect comprises
a one-shot multivibrator connected to said means to compare,
said one-shot multivibrator constituted to trigger upon receiving said electrical output,
and said one-shot multivibrator also connected to said means to employ said electrical output
to electrically disconnect said power supply from said pulse-producing apparatus.

6. In an electrical line-charging pulse-producing apparatus
having a power supply,
means to for ma first amplitude of integrated electrical energy proportional to the electrical charge upon the line of said pulse-producing apparatus,
means to form a second amplitude of integrated electrical energy proportional to the electrical energy supplied to said pulse-producing apparatus from said power supply,
summing diode means to compare said first with said second amplitudes of electrical energy to provide an electrical output whenever the absolute value of said second amplitude is greater than that of said first amplitude,
and electrically actuated switch means connected to employ said electrical output to electrically disconnect said power supply from said pulse-producing apparatus.

7. In a pulse-producing apparatus
having means to integrate electric current and a source of electric power,
said means to integrate electric current connected to said source for the production of pulses;
an overload circuit comprising
further separate means to integrate electric current,
said further means to integrate connected between said source and said apparatus,
said means to integrate and said further means to integrate connected to provide opposed voltage outputs,
means to combine said voltage outputs,
means to pass electric current connected to said means to combine,
and said means to pass current constituted and connected to actuate said overload circuit
upon said further means to integrate producing the larger voltage ouput.

8. In an electrical modulator having artificial transmission line pulse-forming means, and an electrical power supply,
an electrical overload circuit comprising
electrical means for forming electrical energy in proportion to the electrical energy present in said pulse-forming means,
further electrical means for forming electrical energy in proportion to the electrical energy supplied by said power supply to said pulse-forming means,
electrical means to oppositely combine said formed electrical energies,
output means connected to said means to oppositely combine to produce an electrical output only when the level of electrical energy of said further means exceeds the level of electrical energy from said means-for-forming,
switch means connected between said power supply and said pulse-forming means,
said switch means also connected to said output means for actuation when said output means produces an output.

9. In an electrical modulator having pulse-forming means, and a power supply,
and an inductor connected between said power supply and said pulse-forming means;
an electrical overload-sensing and brief-interval power-removing circuit comprising
a voltage divider for obtaining a voltage related to the voltage to which said pulse-forming means is charged,
an electrical integrating circuit connected to said power supply to provide a voltage related to the integral of the current supplied to said pulse-forming means,
a summing network having two inputs and an output,
one input of said summing network connected to said voltage divider,
the other input of said summing network connected to said integrating circuit,
a diode having a breakdown voltage connected to the output of said summing network,
a normally-closed switch connected between said power supply and said inductor,
means to pass an electric current through said diode upon its breakdown,
said normally-closed switch connected to said means to pass current and to said diode
to open said switch when said diode breaks down,
said summing network, diode and means to pass current constituted to break down said diode
whenever the voltage from the integrating circuit exceeds that from said voltage divider,
and thus being effective in removing electrical energy from said pulse-forming means
as soon as an abnormality in the operation thereof starts to occur.

10. The electrical apparatus of claim 3 in which
said shorting means is comprised of a diode and
a four-layer diode connected in series.

11. The electrical apparatus of claim 3 in which
said shorting means is comprised of a controlled rectifier having a cathode and a control electrode, and
a transformer connected between said cathode and said control electrode for triggering said controlled rectifier.

References Cited by the Examiner

UNITED STATES PATENTS

| | | | |
|---|---|---|---|
| 2,659,008 | 11/1953 | Floyd | 328—8 X |
| 2,710,367 | 6/1955 | Clark | 317—27 X |
| 2,815,445 | 12/1957 | Young et al. | 331—62 X |
| 3,119,069 | 1/1964 | Eichenauer et al. | 317—31 X |

MILTON O. HIRSHFIELD, *Primary Examiner.*

SAMUEL BERNSTEIN, STEPHEN W. CAPELLI, *Examiners.*

J. D. TRAMMELL, *Assistant Examiner.*